United States Patent [19]
Zarate

[11] Patent Number: 5,661,987
[45] Date of Patent: Sep. 2, 1997

[54] THREE-BED NONIMMOBILIZED RAPID PRESSURE-SWING ADSORBER

[75] Inventor: Robert A. Zarate, Costa Mesa, Calif.

[73] Assignee: Pacific Consolidated Industries, Orange, Calif.

[21] Appl. No.: 738,054

[22] Filed: Oct. 25, 1996

[51] Int. Cl.[6] ..................................................... F25J 3/00
[52] U.S. Cl. .................. 62/641; 95/115; 95/125; 96/113; 96/126; 96/146
[58] Field of Search ..................... 62/641; 95/115, 95/125; 96/113, 126, 146

[56] References Cited

U.S. PATENT DOCUMENTS

| | | |
|---|---|---|
| 3,192,687 | 7/1965 | Silava et al. . |
| 3,343,916 | 9/1967 | Chan et al. . |
| 3,501,921 | 3/1970 | Muenger et al. ............... 62/641 |
| 4,070,164 | 1/1978 | Miwa et al. . |
| 4,129,424 | 12/1978 | Armond . |
| 4,131,155 | 12/1978 | Thorogood ...................... 62/641 |
| 4,367,082 | 1/1983 | Tomisaka et al. . |
| 4,380,457 | 4/1983 | Rathbone et al. ............... 62/641 |
| 4,605,425 | 8/1986 | Verrando et al. . |
| 4,640,694 | 2/1987 | Leitgeb et al. . |
| 4,717,406 | 1/1988 | Giacobbe ........................ 62/642 |
| 4,775,394 | 10/1988 | Yamano et al. . |
| 4,783,432 | 11/1988 | Settlemyer . |
| 4,816,039 | 3/1989 | Krishnamurthy et al. . |
| 4,892,565 | 1/1990 | Schmidt et al. . |
| 4,898,599 | 2/1990 | Settlemyer . |
| 4,913,709 | 4/1990 | Kumar . |
| 4,927,434 | 5/1990 | Cordes et al. . |
| 4,957,523 | 9/1990 | Zarate et al. . |
| 4,983,190 | 1/1991 | Verrando et al. . |
| 5,013,272 | 5/1991 | Okada et al. . |
| 5,051,115 | 9/1991 | Leitgeb et al. . |
| 5,122,164 | 6/1992 | Hirooka et al. . |
| 5,350,442 | 9/1994 | Thelen et al. . |
| 5,398,513 | 3/1995 | Klob ....................................... 95/115 |

*Primary Examiner*—Ronald C. Capossela
*Attorney, Agent, or Firm*—Knobbe, Martens, Olson & Bear, LLP

[57] ABSTRACT

An improved three-bed nonimmobilized rapid pressure-swing adsorber for use in a gas separation system. The three beds are connected in parallel and actuated so that at any one time, at least one of the beds is on-line, purifying the gas stream. The sequence of operation is such that during a full cycle of operation, two of the beds will be purging for at least some of the cycle to reduce the purge gas volume flow requirements, and thus increase the efficiency of the system. When a primary adsorber bed is on-line, another bed may be depressurizing from an on-line condition to a purge condition while the third bed is being purged. At a certain time, both the off-line beds are being purged until the third bed is repressurized in preparation for going on-line. Prior to the first bed going off-line and being depressurized, the third bed is placed on-line to ensure an uninterrupted supply of process gas to the system.

14 Claims, 11 Drawing Sheets

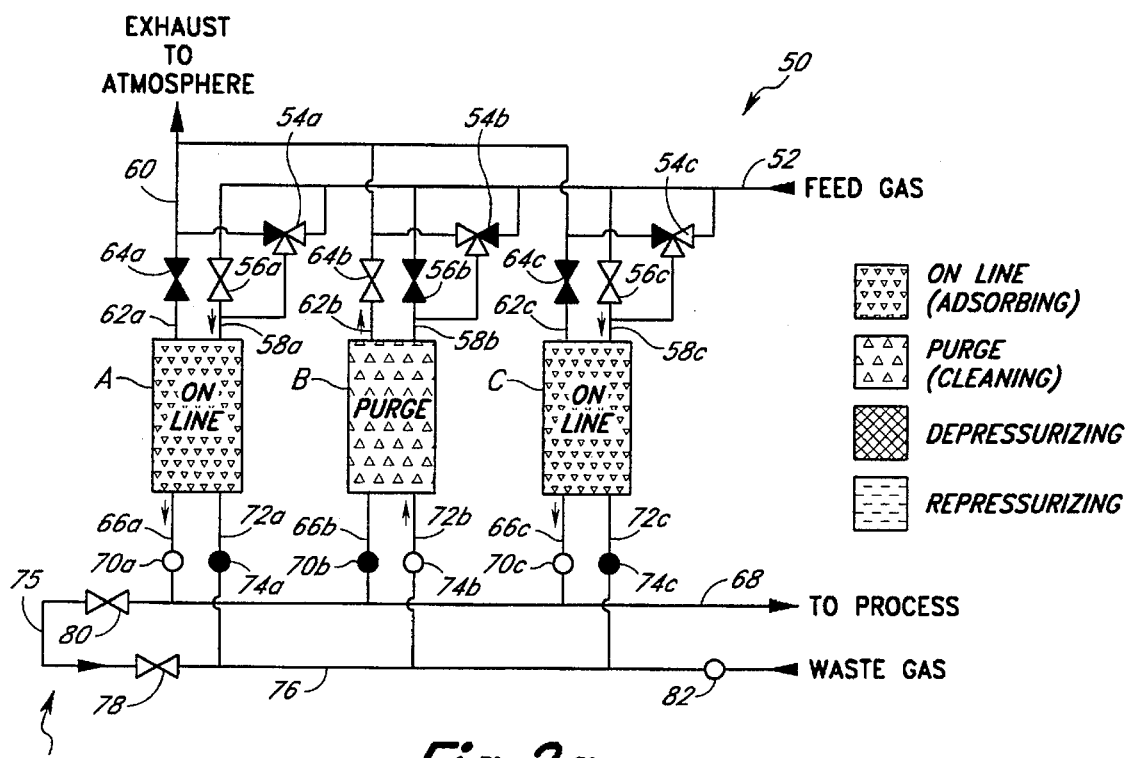
*Fig. 2a* (Time $T_0$)
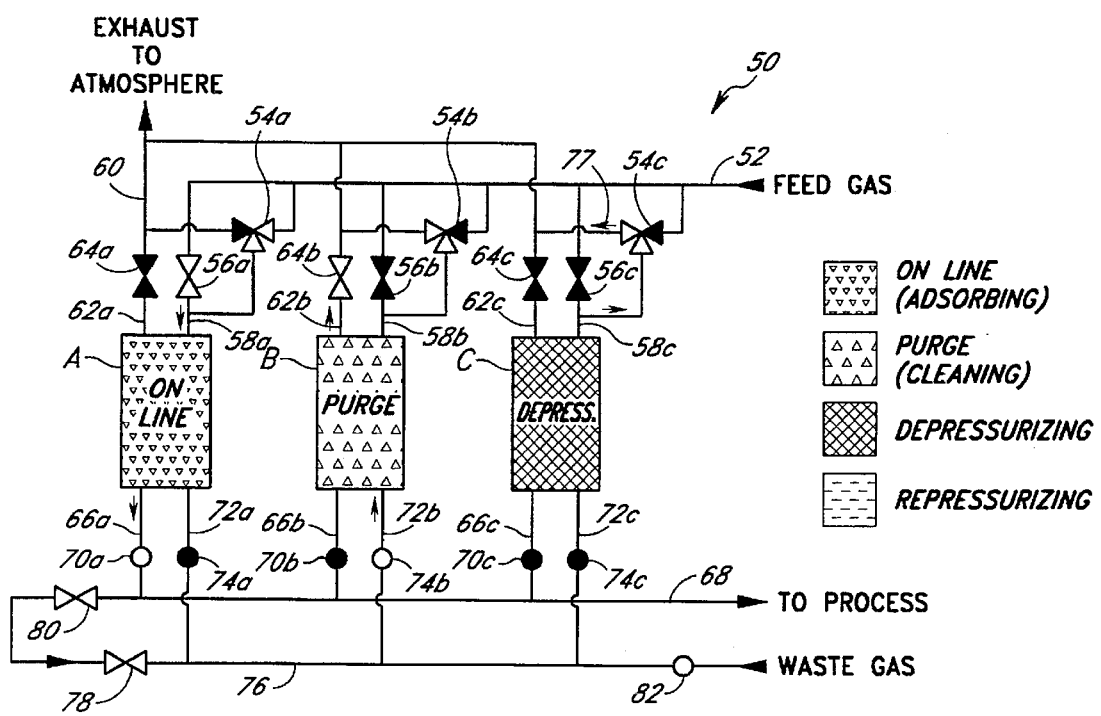
*Fig. 2b* (Time $T_1$)

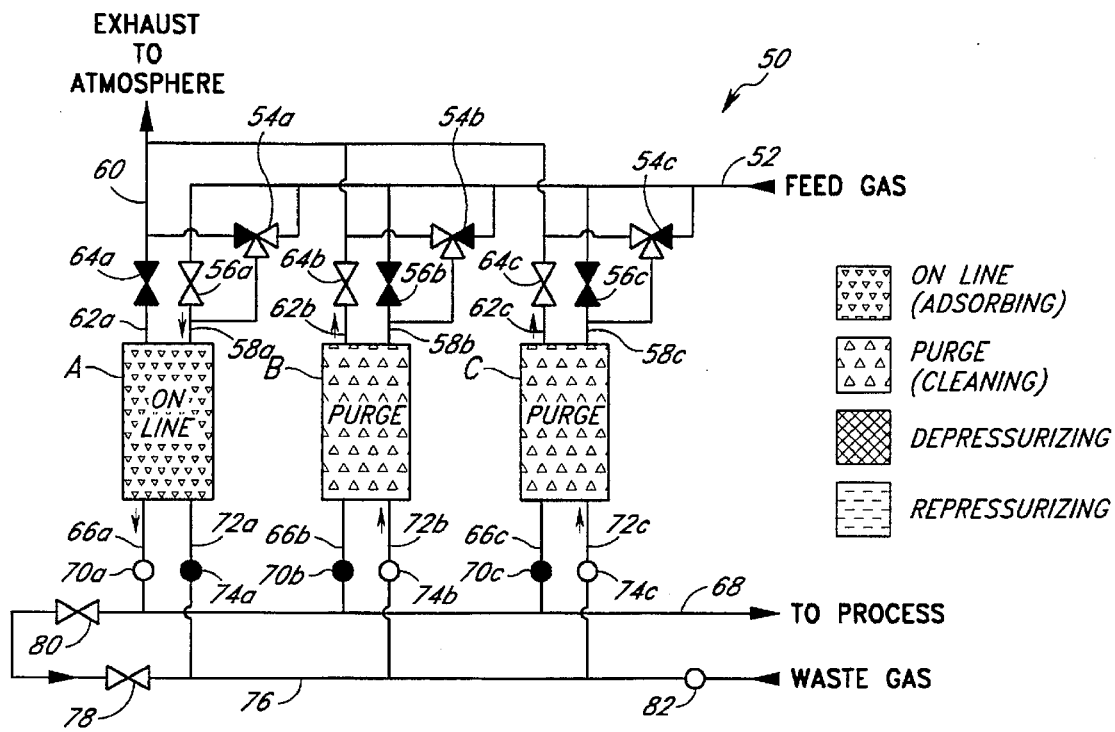
Fig. 2c (Time T₂)
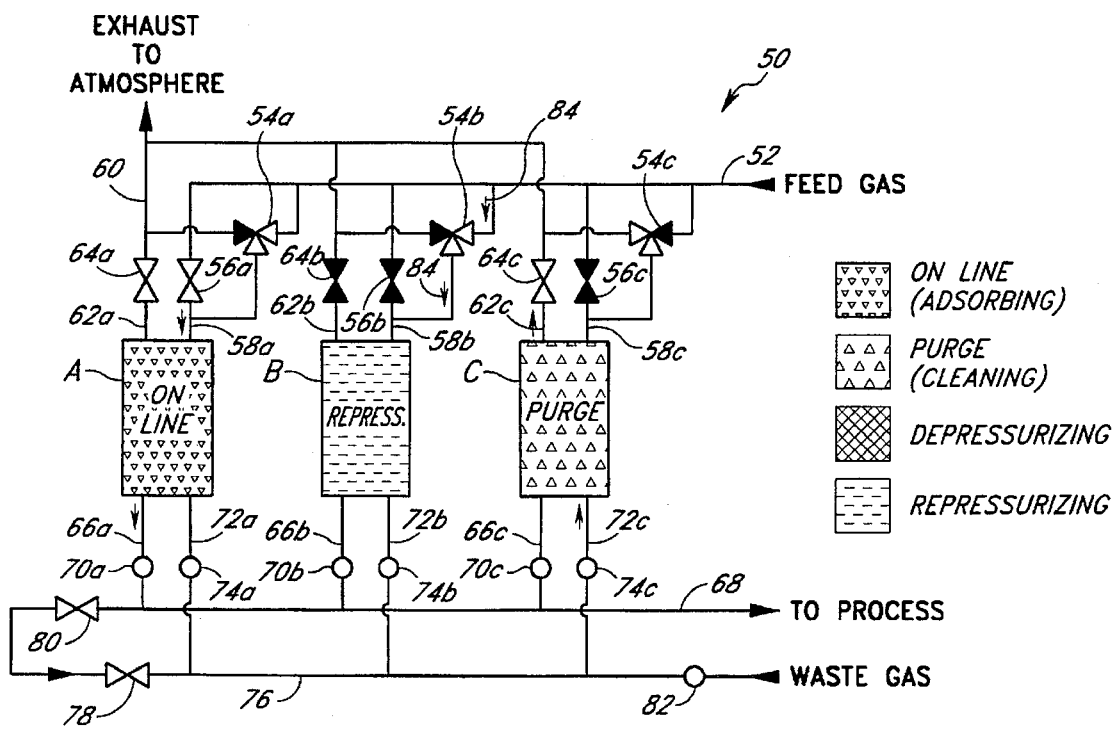
Fig. 2d (Time T₃)

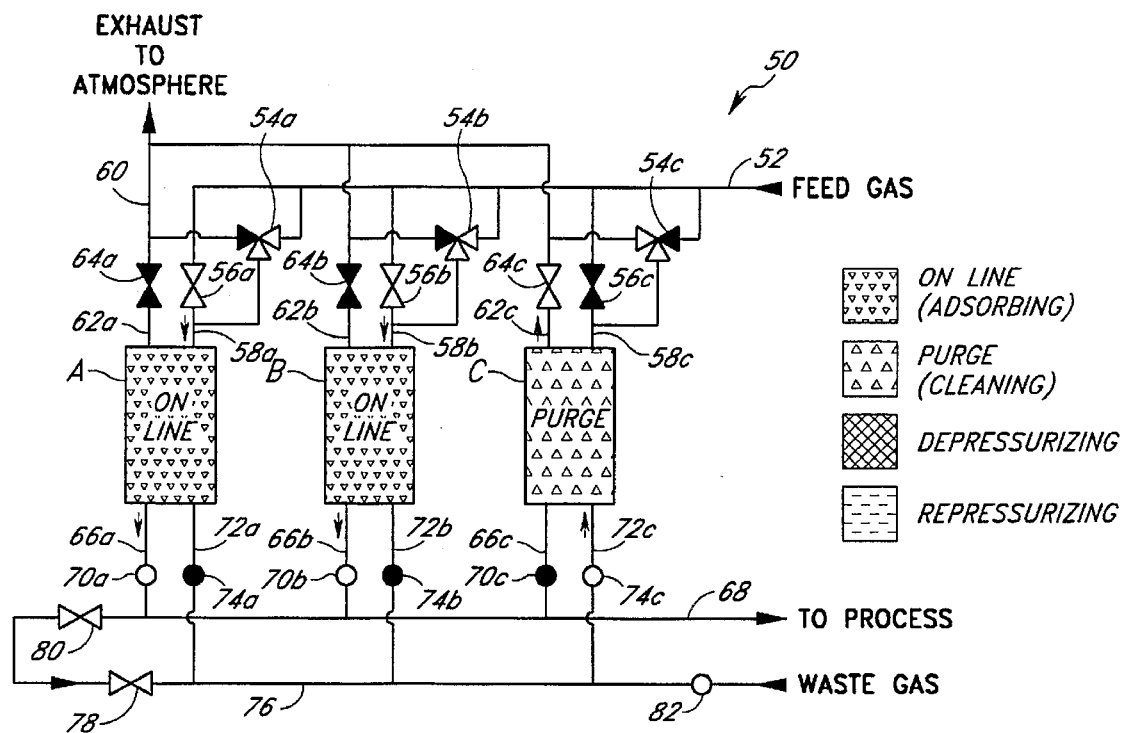
Fig. 2e (Time $T_4$)
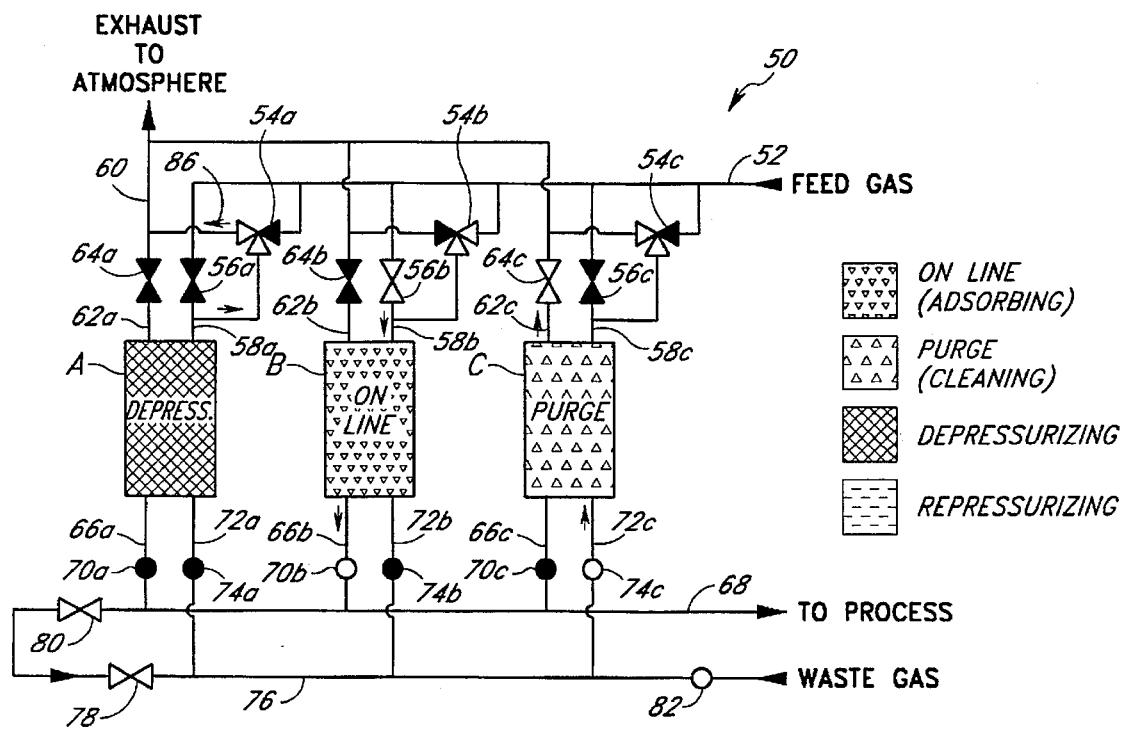
Fig. 2f (Time $T_5$)

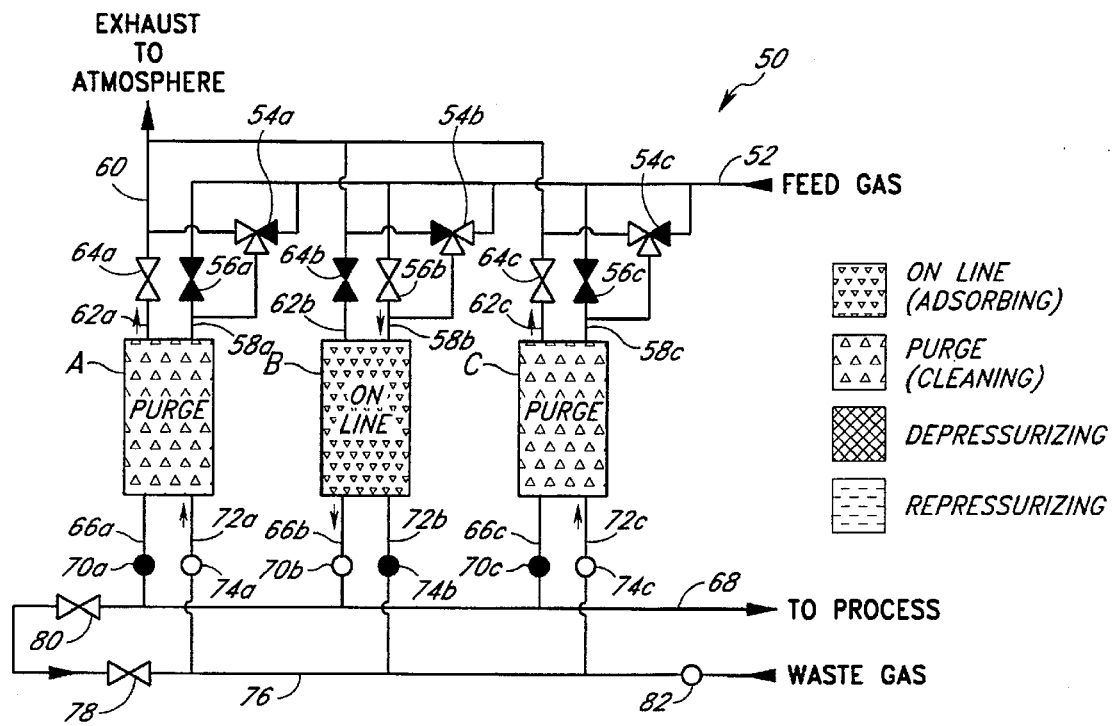
Fig. 2g (Time T₆)
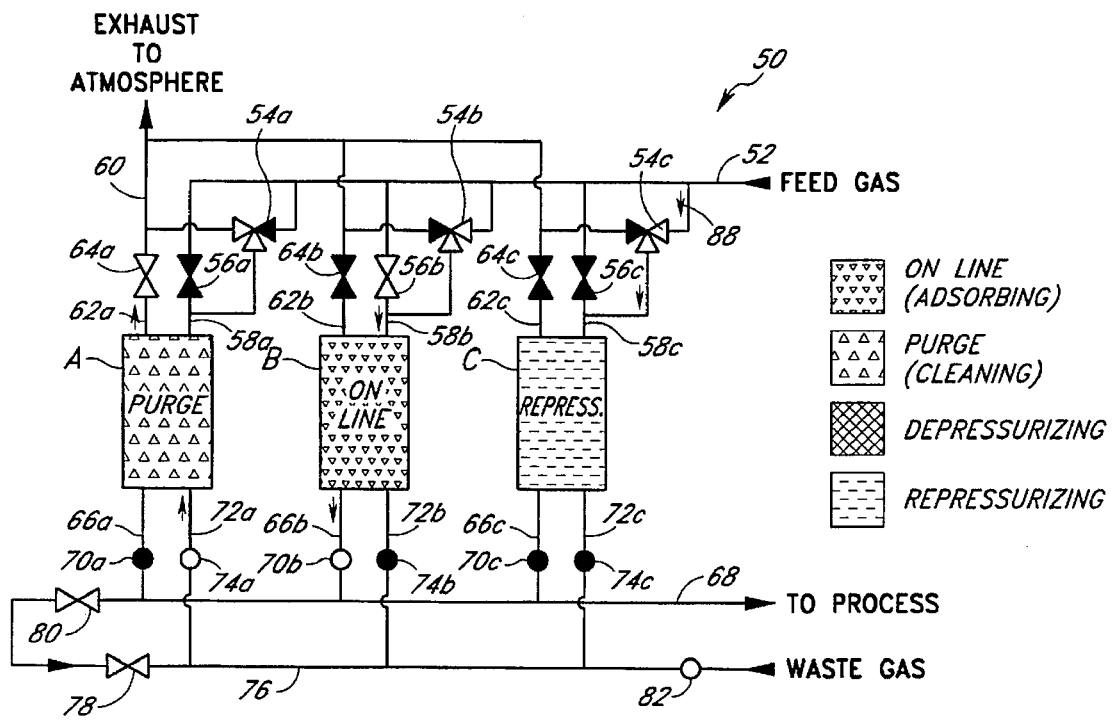
Fig. 2h (Time T₇)

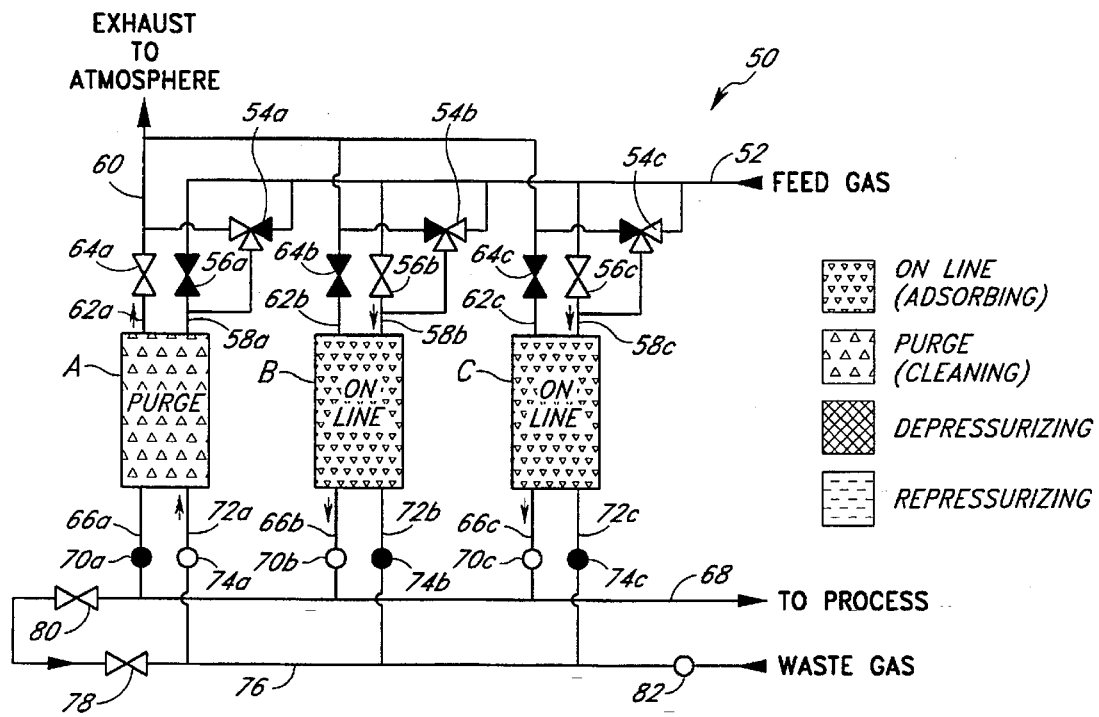
Fig.2i (Time T₈)
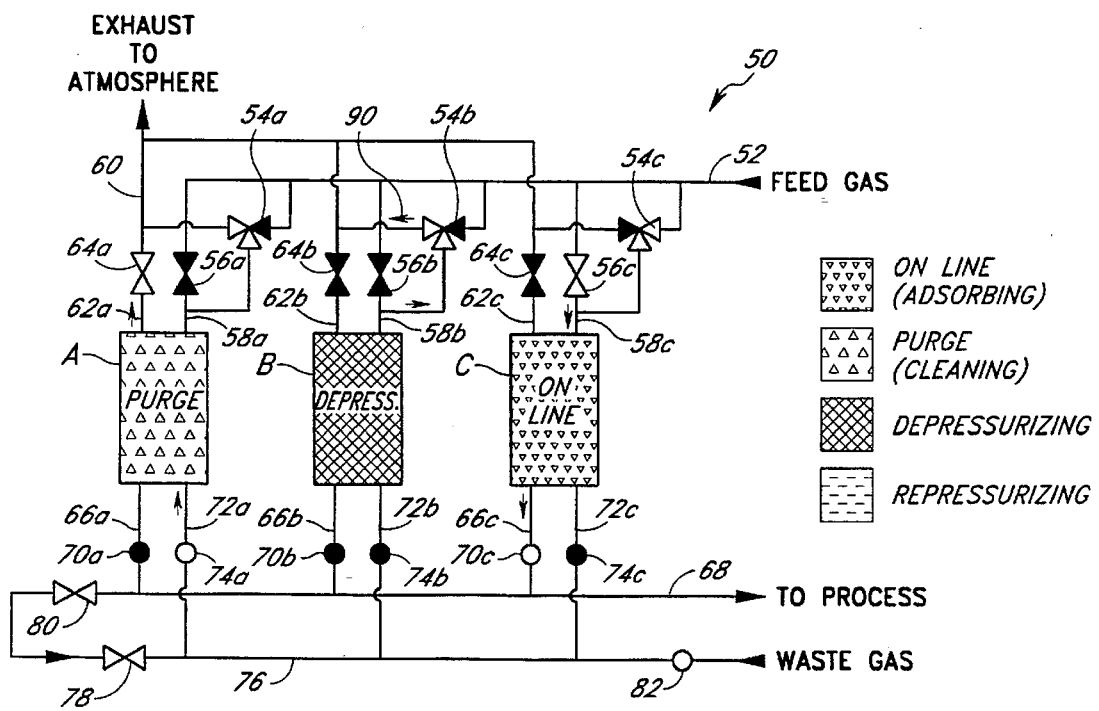
Fig.2j (Time T₉)

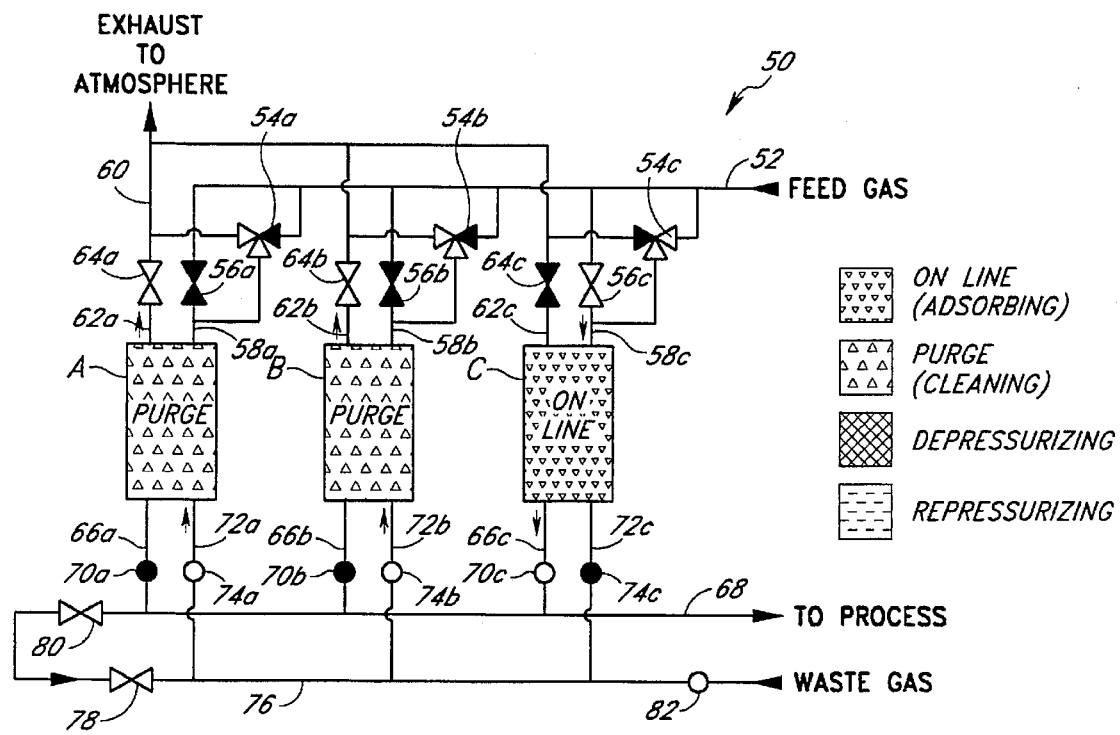
Fig. 2k (Time T₁₀)
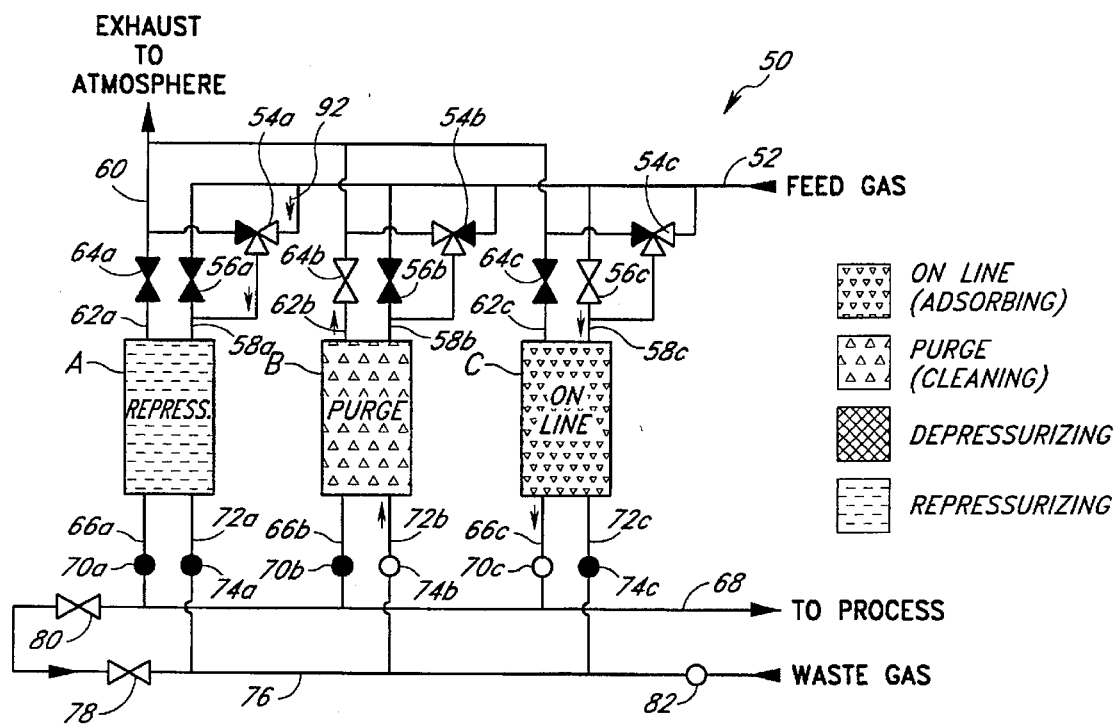
Fig. 2l (Time T₁₁)

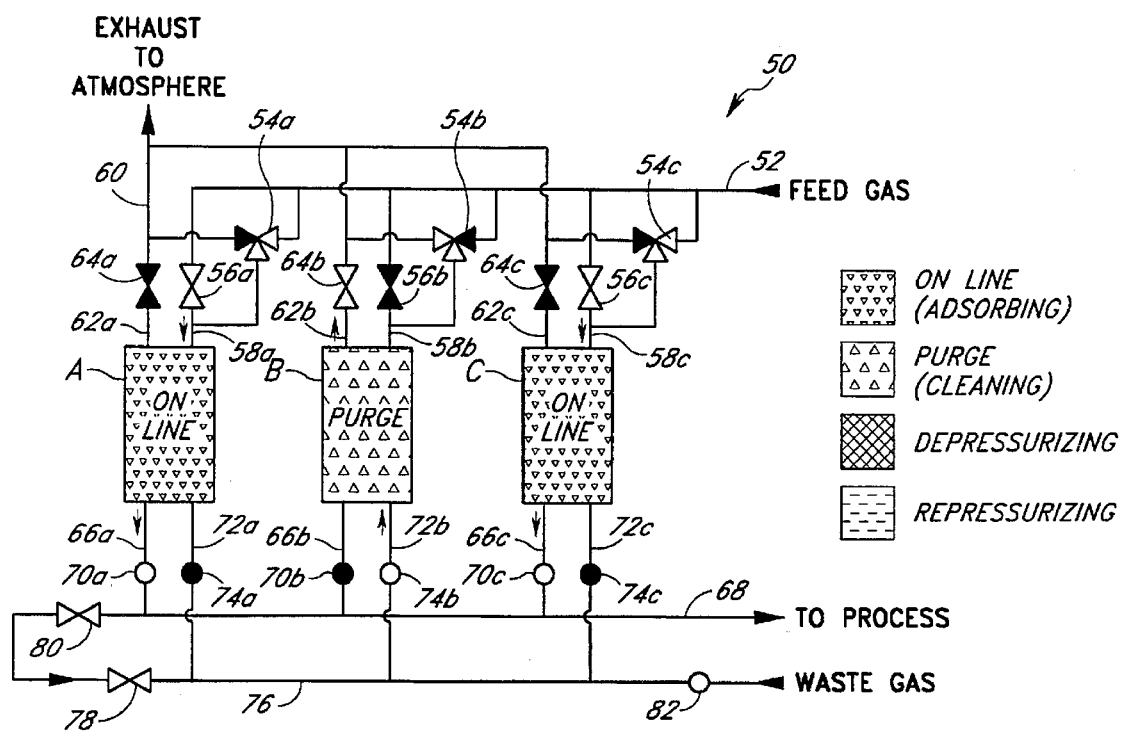
Fig. 2m (Time $T_{12}$)

| STEP | ELAPSED TIME | VALVE NO. FUNCTION OUTPUT NO. 56a A-I 1 | 64a A-E 2 | 54a A-R 3 | 54a A-D 3 | 56b B-I 4 | 64b B-E 5 | 54b B-R 6 | 54b B-D 6 | 56c C-I 7 | 64c C-E 8 | 54c C-R 9 | 54c C-D 9 |
|---|---|---|---|---|---|---|---|---|---|---|---|---|---|
| 0 | 0.0 | O | X | O | X | X | O | X | O | O | X | O | X |
| 1 | 0.6 | O | X | O | X | X | O | X | O | O | X | O | X |
| 2 | 1.2 | O | X | O | X | X | O | X | O | X | X | X | O |
| 3 | 20 | O | X | O | X | X | O | X | O | X | O | X | O |
| 4 | 70 | O | X | O | X | X | X | O | X | X | O | X | O |
| 5 | 70.6 | O | X | O | X | O | X | O | X | X | O | X | O |
| 6 | 90 | O | X | O | X | O | X | O | X | X | O | X | O |
| 7 | 90.6 | X | X | X | O | O | X | O | X | X | O | X | O |
| 8 | 91.2 | X | O | X | O | O | X | O | X | X | O | X | O |
| 9 | 110 | X | O | X | O | O | X | O | X | X | O | X | O |
| 10 | 160 | X | O | X | O | O | X | O | X | X | O | X | O |
| 11 | 160.6 | X | O | X | O | O | X | X | O | X | O | X | O |
| 12 | 180 | X | O | X | O | O | X | X | O | X | O | X | O |
| 13 | 180.6 | X | X | X | O | O | O | X | O | O | X | O | X |
| 14 | 181.2 | X | X | X | O | X | O | X | O | O | X | O | X |
| 15 | 200 | X | X | X | O | X | O | X | O | O | X | O | X |
| 16 | 250 | X | X | X | O | X | O | X | O | O | X | O | X |
| 17 | 250.6 | X | X | O | X | X | O | X | O | O | X | O | X |
| 18 | 270 | O | X | O | X | X | O | X | O | O | X | O | X |

O — OPEN
X — CLOSED

Fig. 4

| | ELAPSED TIME | DURATION | BED A | BED B | BED C |
|---|---|---|---|---|---|
| $T_0$ | — | — | O | P | O |
| $T_1$ | 20 | 20 | O | P ⎫ 70 | D |
| $T_2$ | 70 | 50 | O ⎫ 90 | P ⎭ | P ⎫ |
| $T_3$ | 90 | 20 | O ⎭ | RP | P | 140
| $T_4$ | — | — | O | O | P |
| $T_5$ | 110 | 20 | D | O ⎫ | P ⎭ |
| $T_6$ | 160 | 50 | P ⎫ | O ⎬ 90 | P |
| $T_7$ | 180 | 20 | P ⎬ 140 | O ⎭ | RP |
| $T_8$ | — | — | P | O | O |
| $T_9$ | 200 | 20 | P ⎭ | D | O ⎫ |
| $T_{10}$ | 250 | 50 | RP | P ⎫ | O ⎬ 90 |
| $T_{11}$ | 270 | 20 | O | P ⎬ 70 | O ⎭ |
| $T_{12}$ | — | — | O | P ⎭ | O |

O—online    P—purge    D—depressurizing    RP—repressurizing

Fig.5

THREE-BED NONIMMOBILIZED RAPID PRESSURE-SWING ADSORBER

BACKGROUND OF THE INVENTION

1. Field of the Invention

The present invention relates generally to the production of liquid oxygen and nitrogen through cryogenic distillation of air and, in particular, to a system utilizing a compact, highly efficient, rapid pressure-swing adsorber (PSA).

2. Description of the Related Art

The industrial and commercial uses of nitrogen and oxygen have created tremendous demands for pure oxygen and nitrogen in both liquid and gaseous phases. These demands are primarily met through large-scale stationary production facilities. Unfortunately, these facilities are located a substantial distance from the end user, necessitating the transportation of large quantities of liquid oxygen and nitrogen over substantial distances. For example, mobile medical facilities for emergency response bureaus require large mounts of liquid oxygen at remote locations. As liquid oxygen is highly explosive, and both liquid oxygen and liquid nitrogen must be kept under heavy pressure at extremely low temperatures, the transportation process is both dangerous and expensive.

Oxygen and nitrogen of high purity may be obtained through cryogenic distillation of ambient air. For effective distillation, the ambient air is filtered prior to the distillation process. In particular, chemicals, $H_2O$, and $CO_2$ must be removed to a concentration of less than 1 part per million (ppm) prior to the airstream entering the distillation columns. One such portable liquid oxygen/liquid nitrogen generating system is disclosed in the inventor's U.S. Pat. No. 4,957,523.

The process of adsorption is the assimilation of gas, vapor, or dissolved matter by the surface of a solid. Generally, adsorbers comprise an outer containment vessel with adsorbent material, or desiccant, distributed within, through which a fluid being filtered passes. There are many types of adsorbent material, including molecular sieves, activated alumina, silica gel, adsorbent clays, and activated carbon. Within each class of adsorbent there are hundreds of variations, both in chemical composition and granular form. The granular form includes such shapes as spherical beads, pellet extrudates, tablets, and irregular granules. While adsorbents used in industry are extremely rugged, they can be destroyed if either the internal or external stresses encountered in the service environment are excessive.

Currently, there are two general classes of adsorbers: temperature-swing adsorbers (TSAs) and pressure-swing adsorbers (PSAs). Both adsorbers have two stages of operation: one in which the fluid is filtered and the other in which the adsorber is regenerated or purged of the contaminants which have adsorbed into the material. TSA adsorbers have a filtering stage at around 40° F. and must be purged at relatively high temperatures (around 500° F.). TSA adsorbers typically require at least three hours to change from filtration temperature to regeneration temperature, to complete the regeneration and to change back to process temperature (one regeneration cycle). This regeneration cycle permits substantial contamination of the filtration bed. PSAs, on the other hand, have a relatively constant temperature, but filter at a high pressure and purge at a low pressure. Rapid PSAs have been developed with regeneration cycles of between 30 and 90 seconds. Such rapid pressure swings, however, necessitate the use of immobilized adsorbent material to prevent the fluidization or abrasion of the adsorbent beads or grains. Immobilizing the adsorbent material by coating and bonding the beads or grains means that the entire adsorber must be replaced if the adsorbent material becomes overly contaminated.

The inventor's U.S. Pat. No. 4,957,523 discloses the use of a dual-bed, immobilized, rapid PSA unit. The PSA includes two immobilized molecular sieve-type, bonded regenerable packed cylindrical beds. When one of the beds is on-line, processing the inlet airstream, the second bed is off-line being purged and regenerated. The regeneration of the off-line bed allows the invention to operate continuously without shutting down during periods of bed regeneration. Typically, one bed is online for 95 seconds, while the flow stream is filtered. During this 95 seconds the second bed is first depressurized, or dumped, then purged, and then pressurized in preparation for going on-line again. The stresses generated on the adsorbent material because of the rapid pressure swings necessitate the use of immobilized beds.

For processes with two adsorber beds to be continuous, one adsorber bed must be depressurized from the on-stream pressure to the purge pressure, purged of the impurities, and repressurized to the on-stream pressure during the period of time that the other adsorber bed is purifying or separating the feed gas for the process. The "feed gas" is the unfiltered airstream entering the adsorption units. As a general rule of thumb, for the off-stream adsorber bed to be adequately purged, the purge gas must be of a volume at least equal to the volume of feed gas that passes through the adsorber bed, and preferably more than 1.5 times the feed gas on-stream volume. For example, if 100 cubic feet of feed gas were purified during the on-stream period, 100 cubic feet or more of purge gas must pass through the adsorber bed during the off-stream purging period. The gas used for purging the off-stream adsorber bed is usually a portion of the purified gas exiting the on-stream adsorber bed. Since the gas exiting the on-stream adsorber bed is used for the process, the net yield of purified gas is reduced by the amount required for purging the off-stream adsorber bed. With cryogenic air separation processes, sufficient waste gas must be available for purging the off-stream adsorber bed, or additional purge gas must be extracted from the purified air exiting the on-stream adsorber bed. This can make the cryogenic air separation process less efficient than it would have been had the purging gas requirement not been considered.

The time required to depressurize and repressurize the adsorber beds is the function of the on-stream and purge pressures, the volume of the adsorber beds, and the rates of flow into and out of the adsorber beds. If pressurizing and depressurizing occurs too rapidly, the desiccant material may be damaged due to fluidizing or abrasion, with subsequent loss of desiccant and/or fracturing of the desiccant due to the rapid reduction of the pressure on the exterior surfaces of the desiccant before the pressure in the interior of the desiccant is reduced. The time required for depressurizing and repressurizing without damaging the desiccant is usually optimized based upon the physical size of the adsorber beds, and is thus fixed.

For a more portable system, for example if it is desired to shorten the on-stream time so the size of the adsorber beds can be reduced, the off-stream time must also be shortened to match. Since the depressurizing and repressurizing times are fixed, the time shortening period must come from the purging period. Since the purging time must be shortened a disproportionately greater amount than the on-stream time, the purging gas flow rate must be increased in order to maintain an adequate purge gas volume. This results in even less of the purified gas being available for the end process.

There has been a need for a more compact and efficient rapid PSA system utilizing nonimmobilized desiccant material within the adsorber beds.

SUMMARY OF THE INVENTION

The present invention utilizes three adsorber beds in parallel so that depressurizing, repressurizing, and extended purging times can occur in the third adsorber bed during the time that one adsorber bed is on-stream and the other is off-stream in the purging cycle. This allows any one of the three adsorber beds to have a total purging time equal to two times the on-stream time, minus the depressurizing and repressurizing time. This results in a lower volumetric flow rate requirement for the purging gas because the adsorber bed is being purged for a longer period of time. Therefore, the adsorber beds can be made much shorter than would be the case in a two-bed PSA system, thus increasing the portability of the system. Since the purge gas required to be extracted from the purified airstream is decreased, or is not required at all, feed gas flow rate through the on-stream adsorber bed may be decreased concurrently. This allows for the diameter of the adsorber beds to be smaller, and for the feed gas compressor to require less horsepower. This further enhances the portability of the system and reduces its operating cost.

In one embodiment of the present invention, a method of purifying a feed gas using at least three parallel molecular sieve-type pressure-swing adsorber beds is provided. Each bed is connected to a feed gas inlet conduit and an exhaust conduit on a first end, and a process output conduit and a purge gas conduit on a second end. The method includes first flowing feed gas from the inlet conduit through a first one of the beds at a first pressure from the first end to the second end and to the output conduit. At the same time, purge gas flows from the purge gas conduit through the second and third beds at a second pressure lower than the first pressure from the second end to the first end and to the exhaust conduit. A shut-off time for terminating feed gas flow through the first bed is determined, and purge flow through the second bed is prevented prior to the shut-off time. Also, before shutting off the feed gas flow through the first bed, the pressure within the second bed is raised to the first pressure, and feed gas is allowed to flow from the inlet conduit through the second bed at the first pressure from the first end to the second end and to the output conduit. Then, the feed gas flow through the first bed terminates at the shut-off time and the pressure within the first bed is lowered to the second pressure. Finally, feed gas continues to flow from the inlet conduit through the second bed at a first pressure from the first end to the second end and to the output conduit, while purge gas also flows from the purge gas conduit through the first and third beds at a second pressure lower than the first pressure from the second end to the first end and to the exhaust conduit. Preferably nonimmobilized adsorbent material is used, as it may be replaced if overly contaminated, leaving the surrounding hardware in place. In a preferred embodiment, the pressure within the second bed is raised by allowing a slow flow of feed gas from the feed gas inlet conduit to the second bed through a valve positioned between the feed gas inlet conduit and the second bed first end to prevent damage to the nonimmobilized second bed from large pressure swings. Likewise, the pressure within the first bed is preferably lowered by allowing a slow flow of gas from the first bed to the exhaust conduit through a valve positioned between the exhaust conduit and the first bed first end to prevent damage to the nonimmobilized first bed from large pressure swings.

The present invention provides a rapid pressure-swing adsorber apparatus for use in an oxygen/nitrogen separation system having a cryogenic distillation system. The adsorber apparatus includes a feed gas supply conduit, an exhaust conduit, an adsorption process output conduit leading to the cryogenic distillation system, and a waste gas conduit leading from the cryogenic distillation system. Three parallel beds of nonimmobilized molecular sieve-type adsorbent material, each include a first end having a purge inlet line connected to the waste gas conduit, and a second end having a purge outlet line connected to the exhaust conduit. A feed gas inlet line located in the first end connects to the feed gas supply conduit, and an adsorption process output line located in the second end connects to the adsorption process output conduit. A first pressure-regulated valve positioned in each of the purge inlet lines prevents flow from the corresponding adsorber bed and permits flow upon a predetermined threshold pressure differential between the adsorber bed and the waste gas conduit. A second pressure-regulated valve positioned in each of the adsorption process output lines prevents flow to the corresponding adsorber bed and permits flow upon a predetermined threshold pressure differential between the adsorber bed and the adsorption process output conduit. A purge valve positioned in each of the purge output lines selectably operates to alternately permit and prevent flow from the corresponding adsorber bed to the exhaust conduit. A feed gas valve positioned in each of the feed gas inlet lines selectably operates to alternately permit and prevent flow to the corresponding adsorber bed from the feed gas supply line. A three-way valve positioned in each of the feed gas inlet lines comprises a first leg connected to the corresponding adsorber bed, an output leg connected to the exhaust conduit and an input leg connected to the feed gas supply line. The three-way valve is adapted to allow only a limited flow through either of the input and output legs. The apparatus also includes a microprocessor for controlling the operational states of the purge valves and the three-way valves.

BRIEF DESCRIPTION OF THE DRAWINGS

FIGS. 2a–2m schematically illustrate the adsorber in various stages of operation;

FIG. 4 is a table illustrating the conditions of a number of control valves for discrete steps in the cycle of operation of the adsorber;

FIG. 5 is a table illustrating the conditions of each of the three adsorber beds at the times corresponding to FIGS. 2a–2m.

DESCRIPTION OF THE PREFERRED EMBODIMENTS

Figure 1:
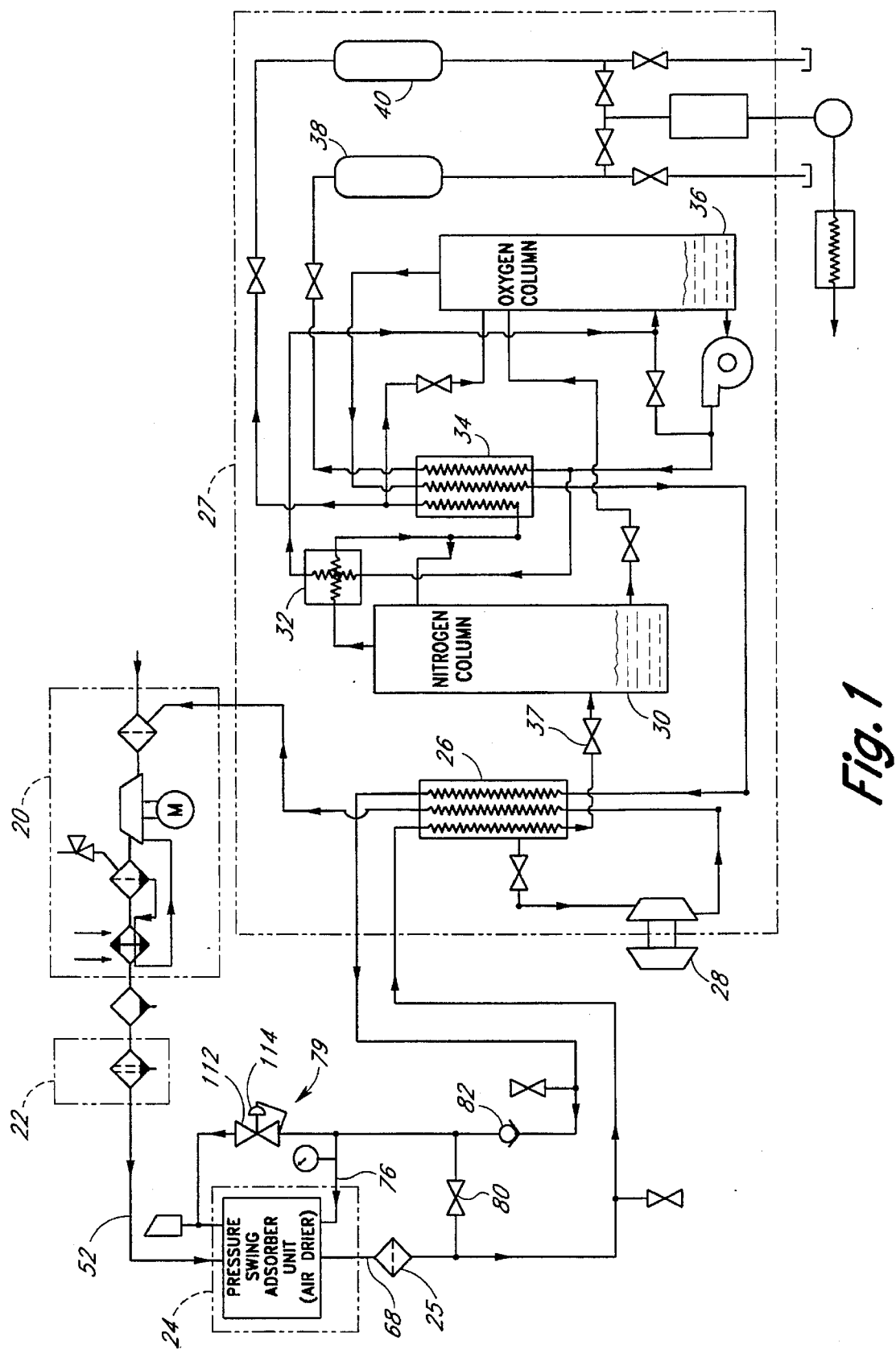
FIG. 1 is a diagram illustrating a cryogenic air separation system utilizing a three-bed, nonimmobilized pressure-swing adsorber of the present invention.

As seen in FIG. 1, a liquid oxygen/nitrogen generating system incorporating the present invention comprises an air compressor assembly 20, a coalescer/HEPA filter 22, a pressure-swing adsorber (PSA) 24, a heat exchanger 26, a turbo expander 28, a nitrogen distillation column 30, a condenser 32, a subcooler 34, and an oxygen distillation column 36. Prefiltered air is pressurized within the air compressor 20, and the air is sent through the HEPA filter 22 to remove most of the oil and water vapor left over from the compression process. The compressed air is then fed into the PSA unit 24 where chemical impurities, $H_2O$, and $CO_2$ vapor are removed to a concentration of less than 1 ppm. In addition, the PSA 24 removes common pollutants found in the atmosphere, such as carbon monoxide, methane, ethane, nitrous oxides, and oil vapors. The dried, purified inlet airstream passes through a filter 25 to remove any particulate matter produced by the PSA 24.

After the PSA 24 and filtering, the airstream flows to the cryogenic distillation process, which, along with the storage tanks 38 and 40, is generally encompassed by the dashed outline 27. The airstream first enters the heat exchanger 26, which cools the inlet air to cryogenic temperatures, partially liquefying the airstream. Approximately 75% of the inlet airstream is diverted from the heat exchanger 26 through the turbo expander 28 where it experiences a pressure loss from approximately 150 psig to 2 psig. The expansion of the air creates a cryogenic air flow which is employed to cool the remaining inlet airstream in the heat exchanger 26. The remaining 25% of the inlet airstream then passes through an air expansion valve 37 which allows a reduction of the inlet airstream pressure to approximately 85 psig, further reducing the temperature of the airstream. The partially liquified cryogenic inlet airstream from the expansion valve 37 enters the dual distilling columns 30, 36 which separate and liquify the nitrogen and oxygen components within the airstream.

The resulting liquid is fed into two storage tanks 38, 40 for the oxygen and nitrogen, respectively. Because the storage tanks 38, 40 are desirably at a lower pressure than the corresponding distilling column 30, 36, the liquid oxygen and nitrogen must be subcooled in the subcooler 34 to remain in liquid phase. The subcooler 34 thereby cools the liquid oxygen and nitrogen below their condensing temperatures, which allows for transfer of the fluids to their respective storage tanks 38, 40 without incurring vaporization of the liquids.

With specific reference to FIGS. 2a–2m, a three-bed, nonimmobilized PSA system 50 is shown. The system 50 comprises three parallel adsorber beds, denoted A, B, and C. Each bed A, B, or C comprises an outer containment vessel and is closely packed with a nonimmobilized desiccant. A feed gas line 52 communicates with each bed A, B, C through input legs of three-way valves 54a, 54b, 54c, and through selectable valves 56a, 56b, 56c. The three-way valves 54 and selectable valves 56 join at a common input line 58 into each bed. It will be noted that the valves and input and output lines to each of the adsorber beds A, B, C, are identical, and thus the description herein may at times refer to individual valves or lines, and at other times may generically refer to any one of the three valves or lines using the element number alone, without alphabetic designation.

Each of the three-way valves 54 includes an output leg in communication with an exhaust line 60 common to all three absorber beds. Each of the absorber beds has an exhaust outlet 62 in communication with the exhaust line 60 through a valve 64. On the other end of each of the adsorber beds, shown in the lower portion of FIGS. 2a–2m, an adsorber bed output line 66 leads to a cryogenic distillation process input line 68. Each one of the adsorber beds has a check valve 70 positioned in the output line 66. A purge inlet line 72 for each of the adsorber beds also includes a check valve 74 between the adsorber bed and a waste gas line 76.

Figure 3:
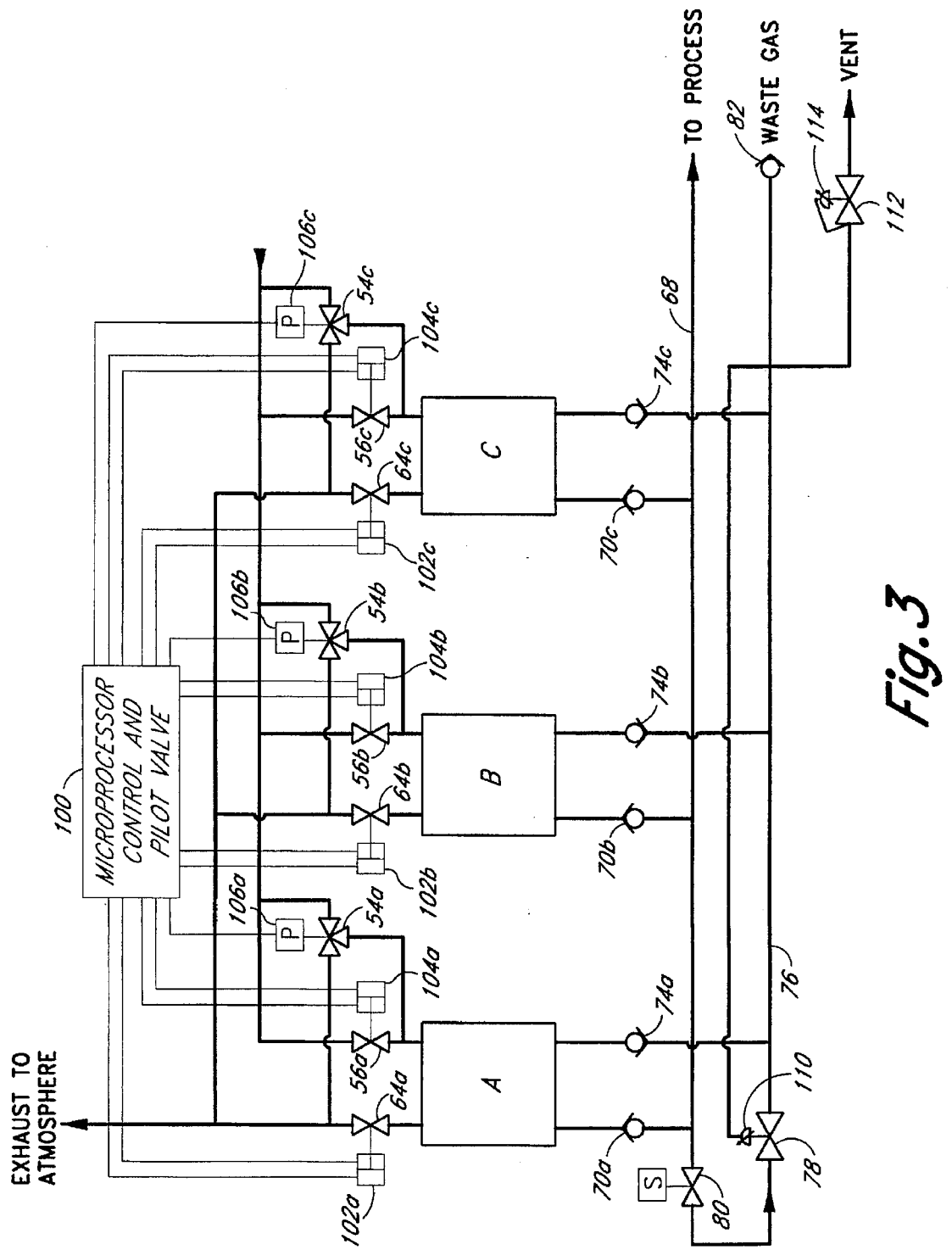
FIG. 3 schematically illustrates the adsorber of FIGS. 2a–2m and a microprocessor control system.

As will become clearer from the description of FIGS. 3 and 4, the valves 54, 56, 64, 70 and 74 are of a specific type for controlling the states of operation of the three-bed PSA unit 50. The operational state of each valve is indicated by the valve being either shown in outline to designate open, or shown blackened in to designate closed. The selectable valves 56 and 64 are preferably poppet-type valves wherein the poppet position is determined by an air-operated double-acting piston and the air to opposite sides of the piston is controlled by a solenoid (102 and 104, respectively, shown in FIG. 3). Likewise, the operational state of the three-way valves 54 is indicated by the blackened portions of the upper left (output) or right (input) leg for each valve. The valves 56 and 64 are either open or closed allowing or preventing flow through each respective line. The three-way valves 54 are essentially toggle switches alternately permitting the flow of input feed gas into the respective adsorber bed, or the flow of purge gas from the adsorber bed to the exhaust line. The valves 70 and 74 are pressure-regulated check valves allowing flow in only one direction, and then only when the pressure differential on opposite sides of the valve reaches a threshold value. Preferably, the valves 70 and 74 have internal spring-actuated poppets for allowing flow in one direction but not in the opposite direction. In short, the "active" valves in the upper portion of the drawing are each selectively controlled by signals from an external source, while the "passive" valves in the lower portion of the drawings operate based on pressure differentials in the system.

To illustrate the operation of the passive valves, the pressure within the on-line third adsorber bed C at time $T_0$ in FIG. 2a is greater than that in the process conduit 68, and thus gas flows downward through the valve 70c. Valve 70c is "open." On the other hand, the check valve 74c prevents gas from flowing downward into waste gas conduit 76 at all times, and the pressure differential is such that gas will not flow upward into the pressurized bed C. Valve 74c is "closed." At the next time frame $T_1$, shown in FIG. 2b, however, the third adsorber bed C is allowed to depressurize and thus the pressure differential between the bed C and the process conduit 68 reduces such that the check valve 70c closes, preventing gas from the bed from entering the process conduit 68. At the same time, the pressure within the third adsorber bed C remains sufficient to prevent purge gas from the waste conduit 76 from entering the adsorber bed. As the pressure decreases, however, the check valve 74c will eventually open to allow purge gas through the line 72c to purge the third adsorber bed C, as seen in the next time frame $T_2$.

The liquid oxygen/nitrogen generating system further includes a bypass system of conduits 79 for the three-bed, nonimmobilized, rapid pressure-swing adsorber 50 shown in FIG. 1, and in the lower portions of FIGS. 2a–2m and FIG. 3. The process conduit 68 and waste gas conduit 76 are connected in a section of conduit 75 between the junctions with the three adsorber beds A, B, C. A pressure-reducing valve 78 and a solenoid-operated valve 80 are positioned in series in the conduit section 75. A check valve 82 is positioned in the waste gas conduit 76 between the adsorber beds A, B, C and the cryogenic distillation process to prevent backflow to the process. The purge flow to each of the adsorber beds A, B, C may be directly from the waste gas stream produced in the cryogenic distillation process through valve 82 and conduit 76, or may be siphoned off of the filtered or purified process flow from the beds if valve 78 is open. That is, the pressure downstream from the particular bed which is on-line, and thus the pressure in conduit 68 is greater than the waste gas flow pressure in conduit 76, and thus purified process flow from the beds will travel through the open valve 78 into the conduit 76. The purified process flow directly siphoned from the adsorbers is thus available for purging the beds. This siphoned flow from the purified gas stream reduces the total airstream allowed to flow to the cryogenic distillation process, and thus reduces the efficiency of the system. Prior to the waste gas stream reaching a desired level of purification, however, the purge flow must derive from a portion of the process flow. After a certain period of time, the waste stream is is of sufficient volume to provide for all the purge flow, and the valve 78 is closed to allow the entire purified gas stream to flow to the cryogenic distillation process, thus maximizing the efficiency of the system.

The operation of each of the adsorber beds during a number of discrete stages of the overall system operation will be described with reference to FIGS. 2a–2m, and to the corresponding table in FIG. 5. For illustration purposes, the adsorption cycle is broken up into discrete periods $T_0$–$T_{12}$, some of which have a very short duration (indicated to be zero seconds in the chart) and others of which have a much longer duration (such as $T_6$, which has a duration of 50 seconds). The time periods having a very short duration, $T_0$, $T_4$, $T_8$, and $T_{12}$, are illustrated to ensure a complete understanding of the system, and are represented as having durations of zero seconds as no significant volume of flow takes place during the time period, and the time period is less than a second. The durations of these time periods in the preferred embodiment are given in FIG. 5. In other systems and, if desired, in the preferred systems, these time periods could vary.

Each of the adsorber beds A, B, C may be in one of four operational states, indicated with the symbols in the legend of each of FIGS. 2a–2m. More specifically, the adsorber beds may be "on-line" adsorbing contaminants, "purging" to clean the contaminants, "depressurizing" prior to purging, or repressurizing prior to being on-line.

With reference now to FIG. 2a, a first stage of operation is shown, which is chosen arbitrarily from the cyclical repetition of such stages of operation. In the first stage of operation, indicated as time $T_0$, feed gas from the filter 22 at high pressure of 30 to 200 psig, and more preferably between 120 and 150 psig, is passing through conduit 52 through inlet selectable valve 56a into adsorber bed A. Feed gas is also passing through inlet leg of three-way valve 54a into common input line 58a and adsorber bed A. Feed gas is purified (or separated) through adsorber bed A and exits via valve 70a and into conduit 68 for delivery to the cryogenic distillation process. The check valve 74a does not permit flow from the adsorber bed A to the waste gas conduit 76, and prevents flow in the opposite direction due to the higher pressure in the adsorber bed A in comparison with the waste gas conduit 76.

At the same time that adsorber bed A is on-line, the second adsorber bed B is being purged. In this respect, valve 64b is held open and valve 74b is open due to the pressure differential between the waste gas conduit 76 and second adsorber bed B, thus allowing purge flow from the waste gas conduit 76 through bed B to the exhaust conduit 60. Valves 56b, and 70b are closed during this time, as is the input leg of valve 54b. The third adsorber bed C is also on-line at this time, with the valves 56c and 70c open, as well as the input leg of valve 54c.

To transition between the operational states of FIGS. 2a and 2b, the feed gas selectable inlet valve 56c is closed, and outlet valve 70c is caused to close, at third adsorber bed C shut-off time at the start of time period $T_1$ (FIG. 2b). This momentarily locks feed gas at high pressure in adsorber bed C. The input leg of valve 54c is closed immediately after selectable valve 56c and the output leg of valve 54c opens to begin a controlled, slow depressurization of adsorber bed C by passing the diminishing high-pressure gas into exhaust conduit 60 and out to the atmosphere. The output leg of valve 54c allows the adsorber bed C to depressurize at a flow rate such that the nonimmobilized desiccant does not fluidize. As is well known in the adsorber industry, the superficial velocity of the pressure front in a PSA bed must be below a predetermined value to prevent the desiccant material within the bed C from fluidizing. Typically, the velocity is less than 30 feet per minute (fpm) to avoid such fluidizing, and is usually between 20–30 fpm. Thus, the depressurizing flow rate through the output leg of valve 54c is designed for the particular system architecture to induce a superficial pressure front velocity in bed C of less than 30 fpm.

During the period $T_1$, purge gas at essentially atmospheric pressure (0.5 to 5 psig) is being fed into waste gas conduit 76 through pressure-reducing valve 78 (if valve 80 is open) from the adsorption process, and/or through valve 82 from the waste stream of the cryogenic distillation process. This purge gas flows through purge gas inlet valve 74b, through second adsorber bed B (in a direction opposite to that which the feed gas flows when the bed is on-line), through valves 64b and 54b, and into exhaust conduit 60 leading to the atmosphere. The depressurizing gas flow is indicated by the arrows 77.

At time $T_2$, shown in FIG. 2c, valve 64c is opened and 74c opens due to the pressure differential between the waste gas conduit 76 and third adsorber bed C, thus allowing purge gas from waste gas conduit 76 to pass into adsorber bed C. Valves 70b and 70c are closed due to the pressure in outlet process conduit 68 being higher than the pressure in either of the second or third adsorber beds B or C. The valve 64c is opened at a predetermined instant when the pressure in the third adsorber bed C has depressurized to a level sufficient for purging. One of skill in the art will recognize that the time required for slow depressurizing varies based on the geometry of the system and flow parameters, and also that the pressure within the adsorber bed may be sensed and fed back into a control system for actuating the valve 64c. Purge gas then flows from the conduit 76 through the valve 74c and through the third adsorber bed C. During time $T_2$, the first adsorber bed A remains on-stream purifying or separating the feed gas, and both the second and third adsorber beds B and C are off-stream having the impurities they adsorbed during their on-stream period removed, or desorbed, with purge gas.

At an appropriate time prior to impurities breaking through the outlet side of the first adsorber bed A, the purge outlet valve 64b is closed (at the beginning of time period $T_3$, FIG. 2d). The term "impurity breakthrough" refers to the condition when the impurity level within the particular on-line adsorber bed is unacceptable, which is typically when the adsorbent material within becomes saturated with impurities to a point at which some may "break through" to the output side of the bed. It should be noted that the appropriate time prior to impurity breakthrough of the first adsorber bed A is determined empirically, or may be predicted with reasonable certainty from the bed size and flow parameters. To maximize the efficiency of the present system, the on-line bed should be adsorbing contaminants up to the point at which it becomes saturated with impurities. Simultaneously, the parallel bed which will next go on-line should be purging for a maximum time period prior to repressurization. Thus, while the first bed is on-line, the purge period of the next bed will be the total on-line period of the first bed, minus the time to slowly repressurize the next bed. In one specific example set forth in more detail below, the on-line bed adsorbs for 90 seconds, and during that period the next bed purges for the first 70 seconds, and repressurizes for the last 20 seconds. This synchronizes the completion of repressurizing of the next bed with the instant of impurity saturation of the first bed, thus maximizing both the purge and on-line times of each, respectively.

After valve 64b is closed, input leg of valve 54b is opened which allows feed gas from conduit 52 into the second adsorber bed B, as indicated by flow arrows 84. The input leg of valve 54b is designed to allow a controlled, slow repressurization of adsorber bed B. The input leg of valve 54b allows the adsorber bed B to repressurize at a flow rate which, for the particular system architecture, induces a superficial pressure front velocity of less than 30 fpm in bed B to prevent the desiccant material within the bed from fluidizing. During this time, valve 74b is closed due to the pressure in adsorber bed B being higher than the pressure in waste gas conduit 76.

At time $T_4$ (FIG. 2e), when the pressure in the second adsorber bed B is essentially the same as the pressure in feed gas conduit 52, selectable valve 56b is opened, putting adsorber B on-line and allowing feed air to be purified or separated by passing through the adsorber bed. In this respect, the purified or separated air downstream of the second adsorber bed B passes through valve 70b and into process conduit 68 for delivery to the subsequent cryogenic distillation process. At this time the first adsorber bed A remains on-line so that the process has an uninterrupted supply and third adsorber bed C continues to be purged.

Shortly after selectable valve 56b is opened to put the second adsorber B on-line, selectable valve 56a closes at first bed A shut-off time at the start of time period $T_5$ (FIG. 2f). Input leg of valve 54a is closed immediately after valve 56a and the now open output leg begins a controlled, slow depressurization of the first adsorber bed A by passing the diminishing high-pressure gas into the exhaust conduit 60 and out to the atmosphere (shown by flow arrow 86). During this time, purge gas, at essentially atmospheric pressure (0.5 to 5 psig), is still being fed into waste gas conduit 76 through pressure-reducing valve 78 (if valve 80 is open) and/or valve 82 from the waste gas stream of the cryogenic distillation process. This purge gas flows through valve 74c in a direction opposite to the normal flow of feed gas, through valve 64c and output leg of valve 54c, and into exhaust conduit 60 leading to the atmosphere. During this time, valves 70a and 70c are closed due to the pressure differential between the process conduit 68 and the pressure in the first and third adsorber beds A and C, respectively.

As seen in FIG. 2g, at the beginning of time period $T_6$, when the adsorber bed A has depressurized to essentially the pressure in the waste gas conduit 76, valve 64a is opened allowing purge gas to pass through valve 74a and through the first adsorber bed A. Purge gas passes from the adsorber bed A through the valve 64a and output leg of valve 54a, into the exhaust conduit 60. During this time the second adsorber B is on-line, purifying or separating the feed gas, and the first and third adsorbers A and C are off-line, having the impurities they adsorbed during their on-line period removed (desorbed) with purge gas.

At an appropriate time prior to impurities breaking through the outlet side of the second adsorber bed B, valve 64c is closed at the beginning of time period $T_7$ (FIG. 2h). Input leg of valve 54c is immediately opened and allows feed gas (indicated at 88) from conduit 52 to flow through the valve 54c into the third adsorber bed C. The input leg of valve 54c is configured to allow a controlled, slow repressurization of adsorber bed C. Valve 74c is held closed by the pressure in the third adsorber bed C being higher than the pressure in the conduit 76.

At a predetermined time corresponding to when the pressure in the third adsorber bed C reaches essentially the same pressure as that in feed gas conduit 52 selectable valve 56c is opened (time $T_8$, seen in FIG. 2i). This puts the third adsorber C on-line and allows feed air to be purified or separated by passing through valve 70c and into process conduit 68 for delivery to the cryogenic distillation process. The second adsorber bed B remains on-stream so that the process has an uninterrupted supply of purified feed gas.

As indicated in FIG. 2j, at the start of time period $T_9$, immediately after selectable valve 56c is opened and puts adsorber C on-line, selectable valve 56b is closed at bed B shut-off time. Input leg of valve 54b is closed immediately after valve 56b and begins a controlled, slow depressurization of the second adsorber bed B by allowing the high-pressure gas from the adsorber bed to exhaust slowly into conduit 60 and out into the atmosphere (as indicated by flow arrows 90). During this time, purge gas at essentially atmospheric pressure is still being fed into conduit 76 through pressure-reducing valve 78 (if valve 80 is open) and/or valve 82 from the waste stream of the cryogenic distillation process. This purge gas flows through valve 74a, through the first adsorber bed A in a direction opposite to that of the feed gas, through valve 64a and output leg of valve 54a, and into the exhaust conduit 60 leading to the atmosphere. Valves 70a and 70b are held closed by the pressure differential between the process gas conduit 68 and the pressure in the first and second adsorber beds A and B, respectively. That is, the pressure in the process conduit 68 is higher than that in the first or second adsorber beds A or B.

At the beginning of time period $T_{10}$, shown in FIG. 2k, valve 64b is opened. At this time the pressure in adsorber bed B is essentially the same as that in the waste gas conduit 76. This allows purge gas from conduit 76 to pass through valve 74b, through the second adsorber bed B, through both valve 64b and output leg of valve 54b, into the conduit 60 and out to the atmosphere. During this time period, the third adsorber C remains on-line, purifying or separating feed gas, and the first and second adsorbers A and B are off-line, having the impurities they adsorbed during their on-stream period removed with purge gas.

At a time prior to impurities breaking through the outlet side of the third adsorber bed C, valve 64a is closed at the beginning of time period $T_{11}$, as seen in FIG. 2l. Immediately afterward, input leg of valve 54a is opened to allow feed gas from conduit 52 to pass therethrough into the first adsorber bed A, as indicated by flow arrows 92, to begin a controlled, slow repressurization of the first adsorber bed. During this time, valve 74a is closed due to the higher pressure in the first adsorber bed A in comparison to the pressure in the waste gas conduit 82.

At a predetermined time $T_{12}$ corresponding to when the pressure in the first adsorber bed A is essentially the same as the pressure in the feed gas conduit 52, selectable valve 56a is opened, as seen in FIG. 2m. This puts the first adsorber A on-line and allows feed gas to be purified or separated by passing therethrough past valve 70a and into the process conduit 68 for delivery to the cryogenic distillation process. The third adsorber C remains on-line so that the process has an uninterrupted supply of purified gas.

It will be noted that FIG. 2m at time $T_{12}$ is the same as the operational state of FIG. 2a at time $T_0$. Thus, the entire cycle is shown through FIGS. 2a–2m, which cycle is repeated for a continuous process.

With reference to FIG. 3, a microprocessor 100 is illustrated connected to a plurality of control elements for selecting the operational states of the "active" valves 54, 56 and 64. More particularly, the microprocessor 100 controls three solenoid valves 102a, 102b, 102c, which, respectively, control the open or closed state of each of the purge exhaust valves 64a, 64b, 64c, of the three adsorber beds A, B, C. Likewise, the operational state of the three main feed gas input valves 56a, 56b, 56c, is selectable by the action of three solenoids 104a, 104b, 104c, connected to the microprocessor 100. Finally, the microprocessor 100 is connected to three solenoid-actuated pilot valves 106a, 106b, and 106c for controlling one of the three-way valves 54a, 54b, 54c. That is, the pilot valves 106 control a piston within the respective three-way valves 54 and function as toggle switches to allow flow either out of the output leg of the three-way valve, or into the input leg, depending on the position of the piston. As indicated above, these operational states are shown in FIGS. 2a–m for each of the three-way valves 54. By controlling the valves 54, 56 and 64, the adsorption process is optimized to enable the volumetric flow of feed gas to be increased while the volumetric flow of waste gas siphoned off in the adsorption process to purge each of the adsorber beds is decreased.

A typical sequence of operation of each of the valves is indicated in table form in FIG. 4. Along the top row, each of the valves is indicated, as well as its function and designated microprocessor output number. Therefore, there are nine outputs from the microprocessor leading to the nine valves. The function of each of the valves is indicated by the letter designation of the respective adsorber bed (A–C), and by the initial of the particular flow through that valve. Feed gas inlet valves 56 are thus designated with a capital I. Purge gas exhaust valves 64 are designed with a capital E. Each three-way valves 54 has two legs: an input leg for repressurizing (R) adsorber bed, and an output leg for dumping or depressurizing (D) the adsorber bed. The table of FIG. 4 shows a number of discrete steps in the microprocessor control algorithm for which actions are taken. At each step, the operation condition of each valve (or leg) is indicated with an O (open) or an X (closed). The specific action taken at each step is shown in bold for clarity.

Step 0 corresponds to an initial condition, or to the condition in step 18 during the adsorption process. Therefore, if the process has cycled at least once, the action taken in step 0 (or 18) is to change the condition of selectable valve 56a from closed to open. This opens the input of feed gas into the first adsorber bed A. In step 2, the selectable valve 56c which controls the feed gas input to the third adsorber bed C is closed from an open state. The elapsed time between step 0 and step 1 is 0.6 seconds. In step 2, after another 0.6 seconds, the three-way valve 54c is switched from a condition allowing feed gas into the third adsorber bed C, to a condition in which purge gas is allowed out of the third adsorber bed. This is indicated by the closed condition of C-R, and the open condition of C-D. In step 3, which is 20 seconds after the initial time 0, the exhaust valve 64c of the third adsorber bed C is opened. This allows the third adsorber bed to begin purging. After another 50 seconds at step 4, the exhaust valve 64b of the second adsorber bed B is closed. This halts the purging of the second adsorber bed B. In step 5, after another 0.6 seconds, the three-way valve 54b is switched from a condition allowing gas to flow from the second adsorber bed, to a condition allowing gas to flow into the adsorber bed from the feed gas conduit 52. After approximately 20 more seconds, the selectable feed gas inlet valve 56b to the second adsorber bed B is opened. And as will be apparent from the table, the adsorption process continues with a similar sequence of valve openings and closings for the entire cycle, until at step 18 the cycle repeats.

FIG. 5 illustrates the time periods $T_0$–$T_{12}$ and the operational states of each of the adsorber beds A, B, C. The duration of each of the intervals is also given in this chart. Thus, it can be seen that, for example, during times $T_1$–$T_3$, bed A is on-line for 90 seconds. Likewise, during the time intervals $T_5$–$T_7$ and $T_{10}$–$T_{12}$, the beds B and C are on-line, respectively, for 90 seconds each. The time between one bed being on-line for 90 seconds and another bed being on-line for 90 seconds is relatively short. Therefore, at times $T_4$ and $T_8$ it will be seen that both adsorber beds A and B are on-line for a short period of time during the transition from A to B. Likewise $T_8$, both beds B and C are on-line during the transition from the on-line 90 seconds of bed B to the on-line 90 seconds of bed C.

In addition, it will be seen that each of the beds is purged for a length of time greater than its on-line time. Therefore, for example, bed A is purged between times $T_6$ and $T_{10}$, for a total of 140 seconds. The same applies to the second and third adsorber beds B and C. To accomplish this, two beds are being purged at the same time. For example, at time $T_2$, beds B and C are both being purged for 50 seconds. Likewise, at times $T_6$ and $T_{10}$, two beds are being purged at the same time for 50 seconds each. This arrangement greatly increases the efficiency of the system and allows for reduced size of the physical components.

It is preferable that the valve frequency be controlled automatically, since the operational times for the valves in each sequence can be from fractions of a second up to three minutes, making it very difficult to control manually. Indeed, the valves are preferably controlled by a central processing unit (CPU) with instructions from a user input. The particular CPU is not critical, and desirably an off-the-shelf programmable logic controller is used, and the specific timing sequences input via an EPROM chip.

The preferred control method involves calculating the specific intervals in which the three adsorber beds are on-line, purging, repressurizing and depressurizing. These intervals may be determined from an analysis of the system size and flow parameters, or from empirical testing of a particular system or scale prototype. The knowledge of the specific intervals allows easy and trouble-free operation or programming of the control sequence, and monitoring of the operation of the system can identify areas in which the sequence is less than optimal, thus prompting a revision to the sequence. Alternatively, however, a system of sensors place in strategic locations in and around the adsorber beds may be used to provide feedback for dynamically controlling the adsorption process. For example, the level of impurities may be detected by a sensor placed near the output end of each bed to determined when that bed has reached capacity and must be purged. Likewise, a pressure sensor may be placed in each bed to sense when the steps of repressurizing and depressurizing are complete. In sum, one of skill in the art will recognize that although a fixed interval sequence is described and shown herein, other more elaborate control systems may be implemented.

Further increasing the efficiency of the system, if the purge gas is derived from the waste gas stream of the cryogenic distillation process, valve 78 can be closed when the process is near full operation, further conserving feed gas flow and reducing the horsepower requirements of the total system.

The following specific example illustrates the improved efficiency of the present system. It is determined that the desired purge factor is 2 (purge gas volume to feed gas volume) for satisfactory purging of the adsorber beds and that it requires 20 seconds each to depressurize and repressurize the adsorber beds without damage to the nonimmobilized adsorbent material within. The nonimmobilized beds are much less expensive and are easier to replace than immobilized beds, and also lend themselves to partial replacement in the field.

The following process conditions prevail:

| | | |
|---|---|---|
| Process pressure | $P_1$ | = 140 psig |
| Purge pressure | $P_2$ | = 2 psig |
| Atmospheric pressure | $P_{atm}$ | = 14.7 psig |
| Feed gas flow rate | $Q_{f,atm}$ | = 600 scfm (cubic feet per minute at standard atmospheric conditions) |
| Purge Factor | PF | = 2 |

The volumetric flow rate $Q_1$ for the on-stream adsorber bed is:

$$Q_f = (Q_{f,atm} \times P_{atm})/(P_1 + P_{atm}),$$

or (600×14.7)/(140+14.7)=57 cubic feet per minute (scfm)

If the adsorber beds have an on-stream time of 90 s (1.5 min), the total volume of feed gas $Vol_f$ during the on-stream period is:

$$Vol_f = t \times Q_1,$$

or 1.5×57=85.5 cubic feet

The purge gas volume $Vol_p$ required is:

$$Vol_p = PF \times Vol_f,$$

or

2×85.5=171 cubic feet, where

PF (Purge Factor)=2

TWO-BED PSAs

The purge time is $t_p$ available for 2 bed PSA is:

90−20−20=50 s

To get 171 cubic feet of purge gas at 2 psig in a 50-second period requires:

$$Q_{p,atm} = (Vol_p/t_p) \times (P_2 + P_{atm})/P_{atm},$$

or

171/(50/60)×(14.7+2)/14.7=233 scfm

The net flow rate available for the process is:

$$Q_{net} = Q_{f,atm} - Q_{p,atm},$$

or

600−233=367 scfm

If the waste gas stream from the cryogenic distillation process were used, the process could only utilize 367 scfm for the final product, an efficiency of 61%.

THREE-BED PSAs

In contrast, the purge time $t_p$ available for the three-bed system is

2×90−20−20=140 seconds

During this 140-second period, the purge gas will be going through two adsorber beds in parallel for 50 seconds ($t_1$) and through one bed alone for 40 seconds ($t_2$). To get 171 cubic feet of purge gas at 2 psig in this 140-second period requires:

$$Q_{f,atm} = (Vol_p/t_p) \times (P_2 + P_{atm})/P_{atm},$$

or

171×(60/140)×(14.7+2)/14.7=83.3 scfm average flow rate

Since only half of the actual flow rate passes through a bed for 100 seconds of the total 140-second purge period, the actual purge gas flow rate required is:

$$Q_{req} = (Q_{avg} \times t_p)/(0.5 \times t_1 + t_2)$$

(83.3×140)/(0.5×100+40)=130 scfm

The net flow rate available for the cryogenic distillation process is:

$$Q_{net} = Q_{f,atm} - Q_{p,atm},$$

or

600−130=470 scfm

If the waste gas stream from the cryogenic distillation process were used, the process could use 470 scfm for the final product, an efficiency of 78%. The improvement realized by utilizing the three-bed pressure-swing adsorber system is 28%; the process efficiency is improved from 61% to 78%.

LONGER TWO-BED SYSTEMS

If the two-bed pressure-swing adsorber system were to have an on-stream time of 15 minutes, the feed gas volume $Vol_f$ required would be:

$$Vol_f = Q_f \times t$$

57×15=855 cubic feet

The purge volume would be:

$$Vol_p = PF \times Vol_f,$$

or

2×855=1710 cubic feet, where

PF (Purge Factor)=2

The purge time $t_p$ for this two-bed pressure-swing adsorber system would be

15−(40/60)=14-⅓ minutes

To get 1710 cubic feet of purge gas at 2 psig in 14-⅓ (43/3) minutes requires:

$$Q_{p,atm} = (Vol_p/t_p) \times (P_2 + P_{atm})/P_{atm},$$

or

1710(3/43)×(2+14.7)/14.7=135.5 scfm

This is still less than the three-bed pressure-swing adsorber. To extend the on-stream time to 15 minutes, the adsorber beds would have to be about 10 times as long as the three-bed pressure-swing adsorber system and about 6.7 times the weight. Also, because of the additional volume of the beds, it would likely require nearly 10 times as long to safely depressurize and repressurize the beds. The additional time has not been accounted for in this analysis. This would further reduce the efficiency gains achieved from longer on-stream times.

The following table graphically illustrates the improved efficiency and other benefits of the present three-bed, nonimmobilized, rapid pressure swing adsorber 50 versus the short and long two-bed systems.

TABLE 1

| System | Efficiency | Process Time | Bed Size | Pressurization Rate | Depressurization Rate |
|---|---|---|---|---|---|
| Preferred System | 78% | 90 seconds | 20" D × 27" L × 3 | 138 psi in 20 seconds | 138 psi in 20 seconds |
| 2-Bed PSA | 61% | 135 seconds | 20" D × 27" L × 2 | 138 psi in 7 seconds | 138 psi in 1 second |
| 2-Bed Lengthened PSA System | 77% | 15 minutes | 20" D × 270" L × 2 | 138 psi in 70 seconds | 138 psi in 10 seconds |

Although this invention has been described in terms of certain preferred embodiments, other embodiments that will be apparent to those of ordinary skill in the art are intended to be within the scope of this invention. Accordingly, the scope of the invention is intended to be defined by the claims that follow.

What is claimed is:

1. An apparatus for distilling liquid oxygen from ambient air, comprising:

a compressor communicating with an air inlet port and an outlet port, said compressor drawing ambient air containing oxygen and nitrogen through said inlet port and compressing said ambient air into a stream of compressed air and forcing said compressed air stream through said outlet port;

a filter communicating with said outlet port for filtering said compressed air stream;

a pressure swing absorber through which said stream of compressed air passes after passing through said filter, comprising:

a first molecular sieve bed; through which said air stream can pass after passing through said filter;

a second molecular sieve bed; through which said air stream can pass after passing through said filter;

a third molecular sieve bed; through which said air stream can pass after passing through said filter; and a main heat exchanger through which said airstream passes after passing through said pressure swing absorber a turboexpander through which a portion of said airstream passes after passing through said main heat exchanger;

an expansion valve through which another portion of said air stream passes after passing through said first heat exchanger, said first expansion valve lowering the pressure of said another portion of said air stream to a temperature at which a substantial portion of said air stream condenses;

a nitrogen distillation column into which another portion of said air stream passes after passing through said first expansion valve, said nitrogen column having a top and a bottom, said another portion of said air stream separating into condensate and vapor in said nitrogen column, said condensate falling toward said bottom of said nitrogen column and said vapor rising to the top of said nitrogen column, said portion of said condensate reaching said bottom of said nitrogen column being oxygen rich;

an oxygen collector into which said condensate passes after passing through said nitrogen column; and a controller for simultaneously (a) directing said stream of compressed air to a one of said beds for a process interval; (b) depressurizing another one of said beds for a first portion of said process interval and then purging said another of said beds for a second portion of said process interval with an air stream from at least one of said nitrogen distillation column and said oxygen collector; and (c) purging yet another of said beds for a first portion of said process interval with an air stream from at least one of said nitrogen distillation column and said oxygen collector and pressurizing said yet another of said beds for a second portion of said process interval.

2. The apparatus of claim 1, wherein said oxygen collector comprises an oxygen column, said oxygen column having a top and a bottom, said condensate separating into part vapor and part condensate in said oxygen column, said part condensate falling toward the bottom of said oxygen column and said part vapor rising toward the top of said oxygen column.

3. The apparatus of claim 2, further comprising a condenser for removing heat from said nitrogen vapor to convert said vapor to liquid nitrogen.

4. The apparatus of claim 3, further comprising an insulating layer surrounding said main heat exchanger, said turboexpander, said nitrogen distillation column, said condenser, and said oxygen collector.

5. A method of distilling liquid oxygen from ambient air using an apparatus, comprising:

drawing ambient air containing oxygen and nitrogen into said apparatus through an air inlet port;

compressing said ambient air into a stream of compressed air;

adsorbing impurities in said filtered airstream with a pressure-swing adsorber having a first molecular sieve bed, a second molecular sieve bed, and a third molecular sieve bed;

cooling a portion of said airstream from said pressure-swing adsorber to a temperature at which a substantial portion of said airstream condenses;

separating nitrogen from oxygen in said cooled portion of said airstream;

collecting said separated oxygen; and alternating the molecular sieve bed which adsorbs said filtered air after a process interval during which the sieve bed which last adsorbed said filtered air is decompressed for a first portion of said process interval and purged for a second portion of said process interval, and during which the sieve bed which was decompressed in the preceding process interval is purged for an initial portion of said process interval and pressurized for a later portion of said process interval, and the sieve bed which was pressurized during the preceding interval adsorbs impurities from said filtered air.

6. The method of claim 5, wherein said purging of said sieve beds includes directing a portion of said airstream from at least one of said nitrogen distillation column or said oxygen collector to purge said bed purging and processing.

7. The method of claim 5, further including the step of filtering said compressed airstream to form a filtered airstream.

8. A rapid pressure-swing adsorber apparatus for use in an oxygen/nitrogen separation system having a cryogenic distillation system comprising:

a feed gas supply conduit;

an exhaust conduit;

an adsorption process output conduit leading to the cryogenic distillation system;

a waste gas conduit leading from the cryogenic distillation system;

three parallel beds of nonimmobilized molecular sieve-type adsorbent material, said beds each including first and second ends, a purge inlet line located in said first end connected to said waste gas conduit, a purge outlet line located in said second end and connected to said exhaust conduit, a feed gas inlet line located in said first end and connected to said feed gas supply conduit, and an adsorption process output line located in said second end connected to said adsorption process output conduit;

a first pressure-regulated valve positioned in each said purge inlet line for preventing flow from the corresponding adsorber bed and permitting flow upon a predetermined threshold pressure differential between said adsorber bed and said waste gas conduit;

a second pressure-regulated valve positioned in each said adsorption process output line for preventing flow to the corresponding adsorber bed and permitting flow upon a predetermined threshold pressure differential between said adsorber bed and said adsorption process output conduit;

a purge valve positioned in each said purge output line selectably operable to alternately permit and prevent flow from the corresponding adsorber bed to said exhaust conduit;

a feed gas valve positioned in each said feed gas inlet line selectably operable to alternately permit and prevent flow to the corresponding adsorber bed from said feed gas supply line;

a three-way valve positioned in each said feed gas inlet line, said 3-way valve comprising a first leg connected to the corresponding bed, an output leg connected to said exhaust conduit and an input leg connected to said feed gas supply line, said three-way valve adapted to allow only a limited flow through either of said input and output legs; and a microprocessor for controlling the operational states of said purge valves and said three-way valves.

9. The apparatus of claim 8, further comprising:

a bypass system including a connecting conduit between said waste gas conduit and said output conduit allowing adsorption process output gas to flow from said adsorption process output conduit to said waste gas conduit to be available for purging said adsorber beds.

10. The apparatus of claim 9, wherein said bypass system includes a pressure-reducing valve and a selectable valve positioned in series in said connecting conduit, said selectable valve being controllable to alternately prevent and allow gas flow through said connecting conduit.

11. The apparatus of claim 8, further comprising:

a check valve positioned in the waste gas conduit between the adsorber beds and the cryogenic distillation process to prevent backflow to the cryogenic distillation process.

12. A method of purifying a feed gas using at least three parallel nonimmobilized molecular sieve-type pressure-swing adsorber beds, each bed connected to a feed gas inlet conduit and an exhaust conduit on a first end, and a process output conduit and a purge gas conduit on a second end, said method including the steps of:

flowing feed gas from said inlet conduit through a first one of said beds at a first pressure from said first end to said second end and to said output conduit, while simultaneously flowing purge gas from said purge gas conduit through said second and third beds at a second pressure lower than said first pressure from said second end to said first end and to said exhaust conduit;

determining a shut-off time for terminating feed gas flow through said first bed;

preventing purge flow through said second bed prior to said shut-off time;

raising the pressure within said second bed to said first pressure;

flowing feed gas from said inlet conduit through said second bed at said first pressure from said first end to said second end and to said output conduit prior to said shut-off time;

terminating feed gas flow through said first bed at said shut-off time;

lowering the pressure within said first bed to said second pressure; and continuing flowing feed gas from said inlet conduit through said second bed at a first pressure from said first end to said second end and to said output conduit, while simultaneously flowing purge gas from said purge gas conduit through said first and third beds at a second pressure lower than said first pressure from said second end to said first end and to said exhaust conduit.

13. The method of claim 12, wherein said step of raising the pressure within said second bed includes allowing a slow flow of feed gas from said feed gas inlet conduit to said second bed through a valve positioned between said feed gas inlet conduit and said second bed first end to prevent damage to said nonimmobilized second bed from large pressure swings.

14. The method of claim 12, wherein said step of lowering the pressure within said first bed includes allowing a slow flow of gas from said first bed to said exhaust conduit through a valve positioned between said exhaust conduit and said first bed first end to prevent damage to said nonimmobilized first bed from large pressure swings.

* * * * *